United States Patent [19]

Furness et al.

[11] Patent Number: 4,813,265
[45] Date of Patent: Mar. 21, 1989

[54] APPARATUS FOR PROVIDING CALIBRATED GAS PRESSURE

[75] Inventors: Joseph T. Furness, Cooden; Henri Rosenberg, Hastings, both of United Kingdom

[73] Assignee: Furness Controls Limited, East Sussex, England

[21] Appl. No.: 74,392

[22] Filed: Jul. 16, 1987

[51] Int. Cl.[4] .................................... G01L 27/00
[52] U.S. Cl. ........................... 73/4 R; 73/4 V
[58] Field of Search ........................ 73/4 R, 4 V

[56] References Cited

U.S. PATENT DOCUMENTS

| | | | |
|---|---|---|---|
| 3,164,979 | 1/1965 | Siegel | 73/4 R |
| 3,473,366 | 10/1969 | Smith | 73/4 R |
| 4,413,526 | 11/1983 | Delajoud | |
| 4,658,829 | 4/1987 | Wallace | 73/4 R |
| 4,664,635 | 5/1987 | Hermann | 73/4 R |

FOREIGN PATENT DOCUMENTS 0075847  4/1983  European Pat. Off. .
0112647  7/1984  European Pat. Off. .
2580807 11/1986  France .

OTHER PUBLICATIONS

NASA Tech. Brief, 68-10412, Dec. 1968.
NASA Tech. Brief, 69-10713, Dec. 1969.

*Primary Examiner*—Stewart J. Levy
*Assistant Examiner*—Robert R. Raevis
*Attorney, Agent, or Firm*—Roberts, Spiecens & Cohen

[57] ABSTRACT

Apparatus for providing a calibrated gas pressure comprising a piston mounted within a cylinder, there being provided a gap between adjacent walls of the piston and cylinder, the cylinder being generally closed at one end so as to provide a closed chamber. The closed chamber includes an outlet for gas at a calibrated pressure and a variable outlet valve. A gas inlet is provided in the wall of the cylinder adjacent to the position of the piston, and the piston engages a force measuring apparatus such that gas, in use, is supplied to the gas inlet and passes to the chamber to provide a calibrated gas pressure within the chamber, the pressure being measured by the force measuring apparatus.

25 Claims, 2 Drawing Sheets

APPARATUS FOR PROVIDING CALIBRATED GAS PRESSURE

FIELD OF THE INVENTION

The present invention relates to apparatus for providing a calibrated gas pressure. The apparatus of the invention preferably comprises an apparatus for providing a calibrated air pressure which is most commonly required, although it may be useful providing other calibrated gas pressures such as a calibrated nitrogen pressure.

In a particularly preferred arrangement the invention may relate to apparatus for providing calibrated low air pressure. A calibrated source of low air pressure (that is a pressure which is close to, but slightly above atmospheric pressure) is widely required, for example, to calibrate commercially used pressure transducers. With a proviso, therefore, that the invention may be utilized with other gases than air and may calibrate pressures slightly below, as well as slightly above atmospheric pressure we will through the majority of the rest of this specification refer to means for providing a calibrated source of low air pressure.

PRIOR ART

A number of means for providing calibrated air pressure have been provided, but most of these have suffered from problems of inaccuracy at very low pressures owing to, for example, difficulties in measuring the very low forces involved.

SUMMARY OF THE INVENTION

The present invention provides an apparatus which will provide a supply of calibrated low pressure air, the pressure of which may be varied as desired and which may be accurately measured. This calibrated air pressure may be applied, for example, to a commercial transducer to test the accuracy of the transducer.

The present invention provides according to a first aspect apparatus for providing a calibrated gas pressure comprising a piston mounted within a cylinder, there being provided a gap between adjacent walls of the piston and cylinder, the cylinder being generally closed at one end so as to provide a closed chamber, the closed chamber including an outlet for gas at a calibrated pressure and a variable outlet valve, a gas inlet being provided in the wall of the cylinder adjacent to the position of the piston, and the piston including means for engagement with a force measuring means, whereby gas, in use, is supplied to the gas inlet and passes to the chamber to provide a calibrated gas pressure within the chamber, the pressure being measured by means of the force measuring apparatus.

The piston may be mounted to the cylinder by means of a suspension means which maintains the piston with the correct clearance between the piston and cylinder walls and allows the piston to move parallel to the axis of the cylinder. The suspension means may comprise a parallel linkage means mounted at each axial end of the piston.

The variable outlet valve may comprise a variable needle valve. The gas supply means may be provided in a position adjacent to the mid point of the height of the piston.

Where the gas comprises air, the end of the piston opposite the chamber is preferably open to atmosphere. Thus, in use, air is supplied to the air inlet, passes in a laminar manner through the gap between the piston and cylinder walls in both directions both towards the end of the piston open to atmosphere and also towards the chamber, passes into the chamber and escapes from the chamber through the variable outlet valve. The variable outlet valve is adjusted so as to provide a desired pressure within the chamber which may be measured by means of a force measuring apparatus such as a weight measuring apparatus such as a balance which is sufficiently accurate for the purpose. The balance may be directly connected to the piston by means to be described, and the pressure within the chamber may be measured from the known diameter of the piston and the apparent weight of the piston. The piston can move freely within the cylinder, because of the gap between the piston and cylinder walls. Because air passes in both directions through that gap then any drag on the piston caused by motion of the air towards the chamber will be balanced by drag caused by movement of the air in the opposite direction through the gap towards exhaust.

The present invention provides, according to a second aspect, apparatus for providing a calibrated gas pressure comprising a piston mounted within a cylinder, there being provided a gap between adjacent walls of the piston and cylinder, the cylinder being generally closed at one end so as to provide a closed chamber, the closed chamber including an outlet for gas at a calibrated pressure and a variable inlet valve, a gas outlet for connection to a pressure reducing means being provided in the wall of the cylinder adjacent to the position of the piston, and the piston including means for engagement with a force measuring means, whereby gas, in use, is supplied to the variable inlet valve and passes into the chamber to provide a calibrated gas pressure within the chamber, the pressure being measured by means of the force measuring apparatus.

BRIEF DESCRIPTION OF THE DRAWINGS

A preferred embodiment of the invention will now be described by way of example only and with reference to the accompanying drawings in which.

DETAILED DESCRIPTION OF A PREFERRED EMBODIMENT

Figure 1:
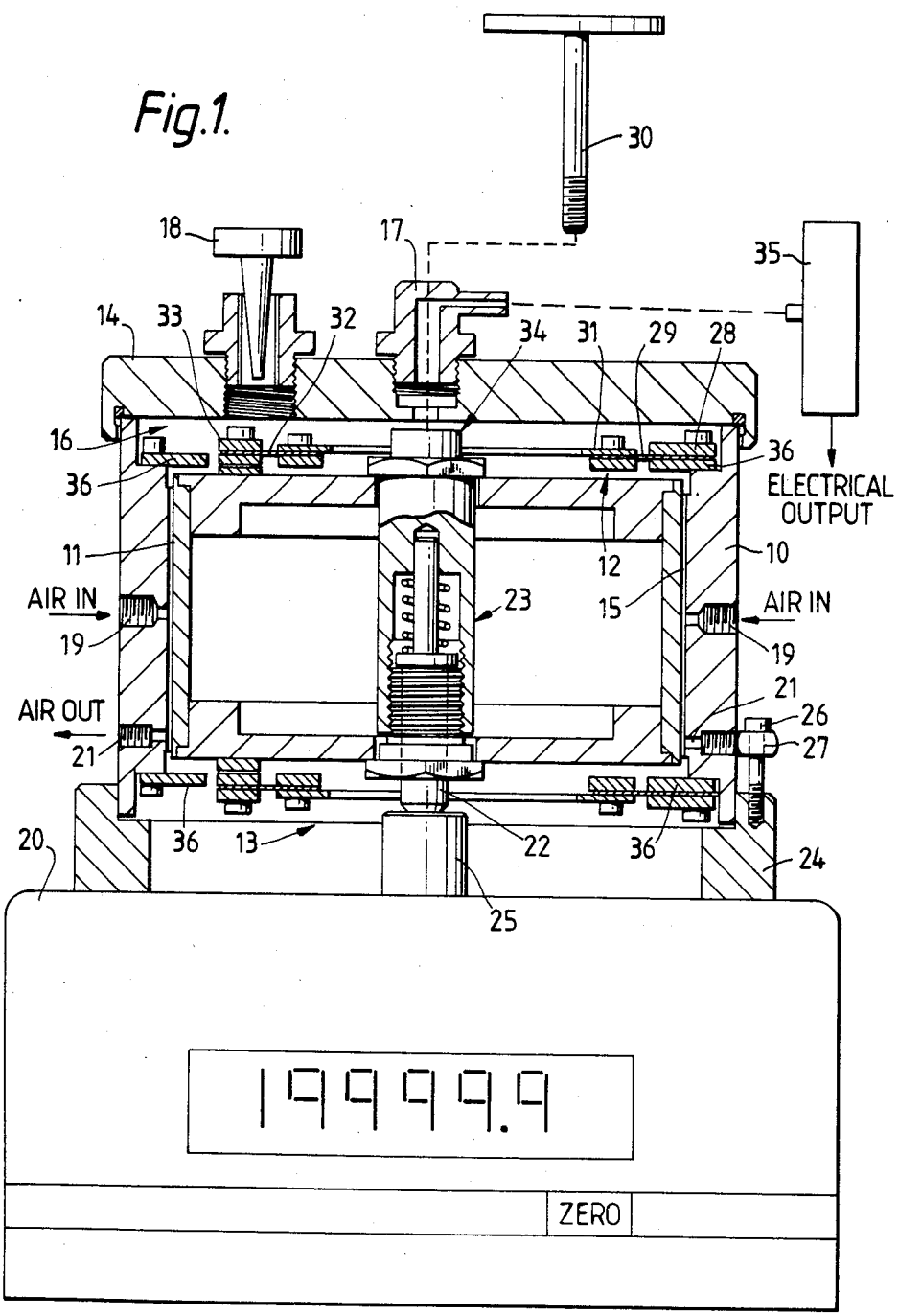
FIG. 1 is a vertical section through apparatus for providing calibrated low pressure air, and, FIG. 2 is a plan view of the apparatus of FIG. 1 with the top cover removed.

Referring to FIG. 1 there is shown apparatus for providing calibrated low pressure air. The apparatus comprises a cylinder 10 of circular section within which is mounted a piston 11. The piston 11 is mounted so as to be moveable within the cylinder 10 by parallel linkage means 12, 13 at opposite axial ends of the piston 11. The means 12, 13 will be described in greater detail later. Annular gap 15 of 0.05 mm is provided between the piston 11 and the cylinder 10.

The upper end of the cylinder 10 is closed by a top cover plate 14 to form a substantially closed chamber 16. The cover plate 14 includes two ports, one port including an outlet fitting 17 through which air at the calibrated pressure may be supplied and a variable outlet valve in the form of a needle valve 18.

Within the wall of the cylinder 10 there is provided air inlet ports 19 disposed at various positions around the circumference of the cylinder 10 and being provided in a position substantially exactly midway between the opposite axial ends of the piston 11.

The end of the cylinder 10 opposite the chamber 16 is not sealed, but there is provided a series of air exhaust outlets 21 disposed at various points around the circumference of the cylinder 10 adjacent to the end of the piston 11 opposite the chamber 16.

Figure 2:
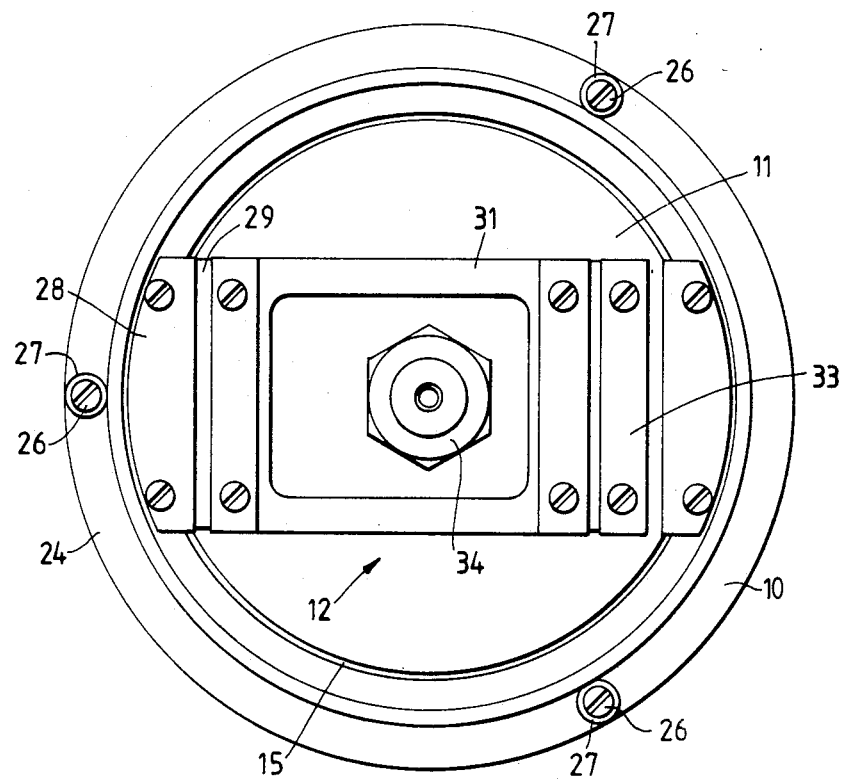

The piston 11 includes at the lower end in FIG. 2 opposite the chamber 16 means, which, in this case is a rod 22 for connection to a force measuring means which may be provided in the form of a weight measuring means. The weight measuring means may be any suitable form such as a null balance 20 with a digital readout. A null balance is one in which a rod 25 thereof, through which force and weight is applied to the balance, does not move or at least moves to a very small extent when a weight or force is applied to it. Furthermore, the balance has the facility that the rod 25 may be preloaded, and then the digital output of the balance can be zeroed so as to provide a zero reading whereby the balance will then only read further additions or subtractions of weight or force. The rod 22 will, in use, bear directly on the rod 25.

The rod 22 is not directly connected to the piston 11, but is connected via a spring connection 23 details of which are clear from FIG. 1, to prevent shock from being transmitted from the piston 11 to the balance 20.

The apparatus may be mounted to the balance 20 as follows. The balance 20 includes, mounted to its top surface and surrounding the rod 25, a metal ring 24 and the apparatus is attached to the ring 24 by means of machine screws 26 passing through rings 27 mounted around the outer surface of the cylinder 10. In this way by simply releasing the screws 26 the apparatus may be removed from the balance and vice versa.

The parallel linkage means 12, 13 will now be described with reference to FIGS. 1 and 2. To one side of the cylinder 10 within the chamber 16 there is mounted a mounting plate 28, the mounting plate clamping a flexible plate 29 which carries a link in the form of a rigid frame 31 extending across the chamber 16 transverse to the axis of the chamber. At the opposite side of the frame 31 there is mounted a second flexible spring plate 32 which is clamped by mounting plate 33 to the end surface of the piston 11. The linkage means 13 is of similar construction and is parallel to linkage 12. In this way, the two means 12, 13 comprise a parallel arm linkage which causes the axis of the piston 11 to remain parallel at all times to the axis of the cylinder 10. Axial movement of the piston 11 is limited by plates 36 mounted at each end of the cylinder 10.

It will be understood that there is a small gap 25 (typically −0.05 mm) between the adjacent cylindrical walls of the cylinder 10 and piston 11 and the means 12, 13 prevent any slight out of axis movement of the piston 11.

It will be noted that the outlet fitting 17 is provided on the axis of the cylinder and piston and may be readily removed, as it is mounted in the top cover plate 14 by means of a screw thread. The top surface of the piston 11 in the chamber 16 includes, on the axis of the piston 11, a fitting 34 which includes an internal screw thread co-axial with the axis of the piston 11.

Other constructional details of the apparatus will be clear from the drawing. All parts described are of stainless steel.

The apparatus may be used in the following manner. In use the apparatus is connected to the balance by means of the screws 26 engaging the metal ring 24. In this position the rod 22 bears on the rod 25 of the balance 20.

The fitting 17 is removed. Air may then be supplied to the air inlet ports 19, the air being provided at a substantially constant pressure. Air enters the inlet ports 19, and some of the air passes upwardly through gap 25 towards the chamber 16 and some downwardly through gap 25 towards the air exhaust outlets 21. The proportion passing in each direction is substantially the same as the pressure at the air exhaust outlets 21 and in the chamber 16 is the same. Thus, any drag between the air and the piston which might cause the piston to move is counter balanced by an equal flow of air in both directions. In any case the air flow is always maintained sufficiently low for there to be laminar flow without turbulence.

The apparatus can then be checked by screwing a weight pan 30 through the hole in the top cover plate 14 left by removal of the outlet fitting 17 into engagement with the internal screw thread on the fitting 34. Weights may be added to the scale pan and the reading of the balance noted so that the linearity of movement of the piston with difference in load can be measured.

Once the apparatus has been checked the screw pan 30 may then be removed, the fitting 17 replaced and reconnected as desired, typically, to a pressure transducer 35 under test. The balance 20 is zeroed i.e. the readout is made zero, this being entirely conventional, and achieved by pushing a zero button on the balance. The pressure within the chamber 16 may be changed by varying the variable needle valve 18 or by varying the pressure of the air supplied to the air inlet ports 19. It will be understood that the pressure within the closed chamber 16 will provide a force on the upper surface of the piston 11 which is transmitted through the piston 11 and rod 22 to the balance. Thus, the pressure within the chamber, and hence the calibrated air pressure supplied through the outlet 17 may be measured from the output reading of the balance, the weight indicated by the balance being provided by a multiplication of the pressure within the chamber and the known area (typically 100 cm$^2$) of the top surface of the piston 11.

The output reading of the transducer 35 may be calibrated against the digital reading of the balance 20.

In this way, we provide an air pressure source which is accurately calibrated by means of the balance and which may be used to calibrate, for example, pressure transducers.

The appparatus may be used in other ways. For example, in place of air, gas pressure may be measured where a gas is passed into the inlet 19.

It is also possible to measure a pressure of air which is below atmospheric and this may be achieved by, for example, applying a partial vacuum to the air inlet 19 in which case air will flow into the outlets 21 and into the needle valve 18 and will create a pressure slightly below atmospheric in the chamber 16. A similar construction may be used to measure a pressure of gas below atmospheric.

What is claimed is:

1. Apparatus for providing and measuring a calibrated gas pressure comprising a cylinder having a cylindrical inner wall, a piston mounted within said cylinder and forming a gap with said cylindrical inner wall, means closing said cylinder at one end thereof to form at said one end with said piston a closed chamber in communication with said gap, a gas inlet in said cylindrical wall adjacent to said piston for receiving gas whose pressure is to be calibrated and for passing the gas to said chamber to provide a calibrated gas pressure within the chamber, an outlet in said closed chamber for supplying gas at said calibrated pressure therefrom, a variable outlet valve communicating with said closed chamber to vary the pressure of the gas within said closed chamber, and force measuring means, said piston including means directly connected to said force measuring means such that the pressure within said chamber is measured by force transmitted through said piston to said force measuring means.

2. Apparatus as claimed in claim 1 comprising a suspension means mounting said piston in said cylinder with said gap formed between said piston and the cylindrical wall and allowing the piston to move parallel to the axis of the cylinder.

3. Apparatus as claimed in claim 2 wherein the suspension means comprises a parallel linkage means mounted at each axial end of the piston.

4. Apparatus as claimed in claim 1 wherein said variable outlet valve comprises a variable needle valve.

5. Apparatus as claimed in claim 1 wherein said gas inlet is provided in a position adjacent to the mid point of the height of the piston.

6. Apparatus as claimed in claim 1 wherein the gas is air and the end of the piston opposite said chamber is open to the atmosphere.

7. Apparatus as claimed in claim 1 wherein said variable outlet valve is adjusted to provide a desired pressure within the chamber whose value can be measured by said force measuring means.

8. Apparatus as claimed in claim 7 wherein said force measuring means which is directly connected to said piston is constructed such that the pressure within the chamber is determined from the known diameter of the piston and said force transmitted through the piston.

9. Apparatus as claimed in claim 1 in which said gap is sufficiently small so that said gas flows in a laminar manner from the gas inlet to the chamber.

10. Apparatus as claimed in claim 1 comprising gas outlet means connected to said gap at a location such that said gas inlet is between the gas outlet means and said chamber whereby gas supplied to said gas inlet can flow in said gap in opposite directions respectively to said chamber and to said gas outlet means.

11. Apparatus as claimed in claim 1 wherein said force measuring means comprises a balance which measures force on the basis of weight, said piston bearing on said balance so that the pressure in said chamber applies force to said piston which together with the weight of the piston is applied to the balance.

12. Apparatus for providing and measuring a calibrated gas pressure comprising a cylinder having a cylindrical inner wall, a piston mounted within said cylinder and forming a gap with said cylindrical inner wall, means closing said cylinder at one end thereof to form at said one end with said piston a closed chamber in communication with said gap, an outlet in said closed chamber connected to an article for subjecting the article to the pressure in the closed chamber, a variable inlet valve connected to said chamber for adjusting the pressure of the gas within said closed chamber, a gas outlet for connection to a pressure reducing means in said cylinder wall adjacent to said piston and communicating with said gap and thereby with said chamber, to provide a calibrated gas pressure in said chamber, and force measuring means, said piston including means directly connected to said force measuring means such that gas supplied to the variable inlet valve passes into the closed chamber to provide said calibrated gas pressure within the closed chamber, the gas pressure within the closed chamber being measured by force transmitted through the piston to the force measuring means.

13. Apparatus as claimed in claim 12 comprising a gas port connected to said gap at a location such that said gas outlet is between said chamber and said gas port whereby gas is extracted at said gas outlet by flow in said gap in opposite directions respectively from said gas port and from said chamber.

14. Apparatus as claimed in claim 12 comprising a suspension means mounting said piston in said cylinder with said gap formed between the piston and the cylinder wall and allowing the piston to move parallel to the axis of the cylinder.

15. Apparatus as claimed in claim 14 wherein the suspension means comprises a parallel linkage means mounted at each axial end of the piston.

16. Apparatus as claimed in claim 12 wherein said variable inlet valve comprises a variable needle valve.

17. Apparatus as claimed in claim 12 wherein said gas outlet is provided in a position adjacent to the mid point of the height of the piston.

18. Apparatus as claimed in claim 12 wherein the gas is air and the end of the piston opposite said chamber is open to the atmosphere.

19. Apparatus as claimed in claim 12 wherein said variable inlet valve is adjusted to provide a desired pressure within the chamber whose value can be measured by said force measuring means.

20. Apparatus as claimed in claim 19 wherein said force measuring means which is directly connected to said piston is constructed such that the pressure within the chamber is determined from the known diameter of the piston and said force transmitted through the piston.

21. Apparatus as claimed in claim 12 in which said gap is sufficiently small so that said gas flows in a laminar manner to said gas outlet from the chamber.

22. Apparatus as claimed in claim 12 wherein said cylinder has a second end opposite said one end, said second end being open to expose said piston to atmospheric pressure.

23. Apparatus for measuring and supplying a gas under pressure to an article, said apparatus comprising
a cylinder having a closed end,
a piston slidable in said cylinder and defining a narrow annular gap therewith, said piston having a first end defining a closed chamber with said closed end of the cylinder, said chamber communicating with said gap for continuous flow of gas therebetween,
a first port communicating with said gap for connection to a gas source to establish a flow of gas through said gap between said port and said chamber to establish a determined gas pressure in said chamber,
gas outlet means for connecting said chamber to an article so that a flow of gas can be established between said chamber and said article at said determined gas pressure and said chamber,
variable valve means connected to said chamber for adjusting the pressure in said chamber, and
balance means supporting the weight of said piston and resisting the force applied to said piston by the pressure of the gas in said chamber, said piston having a second end opposite said first end which bears on said balance means, said balance means providing an output representative of the pressure in said chamber based on said force applied to the balance means via said piston.

24. Apparatus as claimed in claim 23 wherein said cylinder has a second and opposite one end, said second end being open to expose said piston to atmospheric pressure.

25. Apparatus as claimed in claim 23 wherein said balance means is disposed beneath said piston and supports the same.

* * * * *